(No Model.) 4 Sheets—Sheet 1.

T. TRIPP.
CAR BRAKE.

No. 450,762. Patented Apr. 21, 1891.

WITNESSES:
Walter L. Perry
J. Edward Porter

INVENTOR.
Thomas Tripp
BY
E. Frank Woodbury
ATTORNEY.

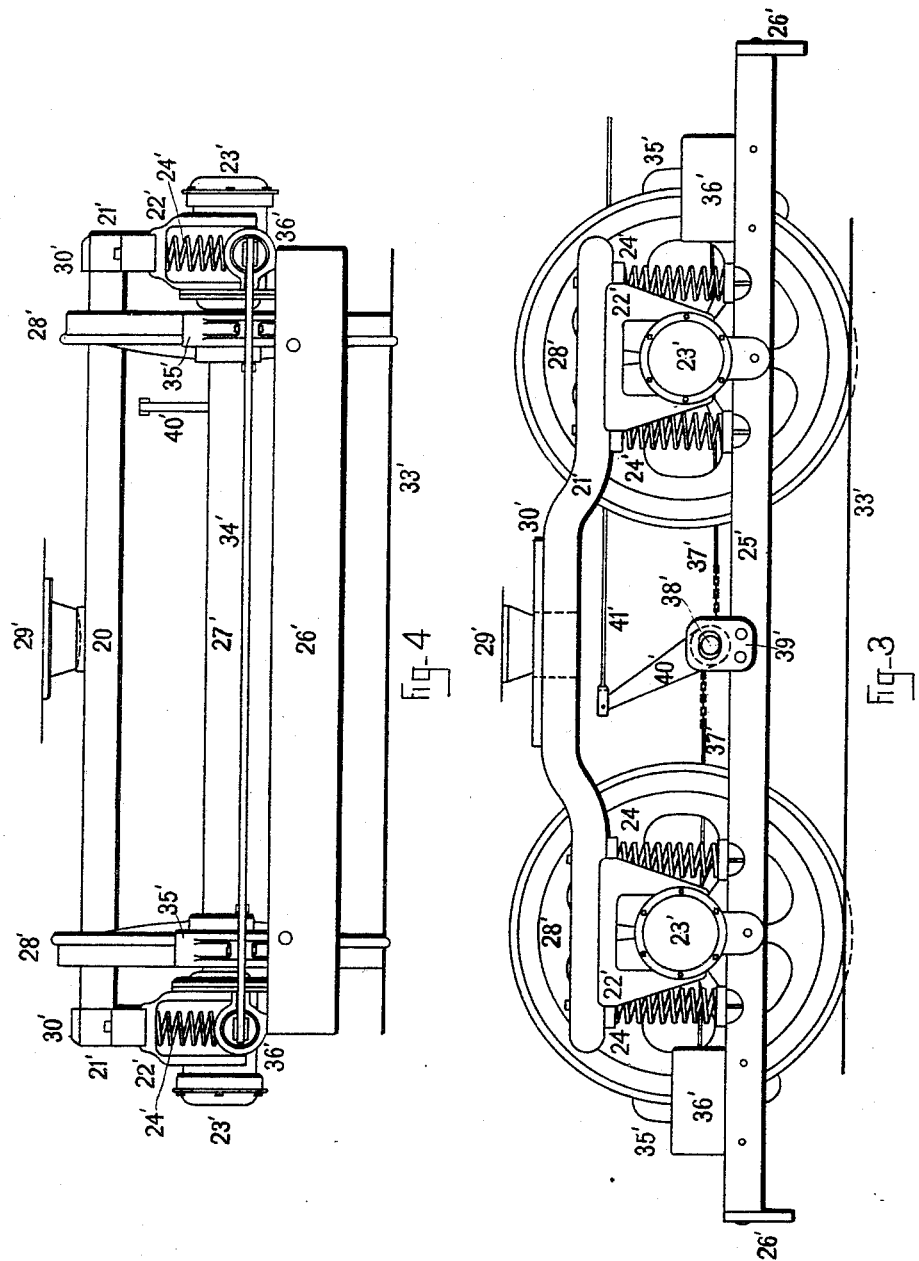

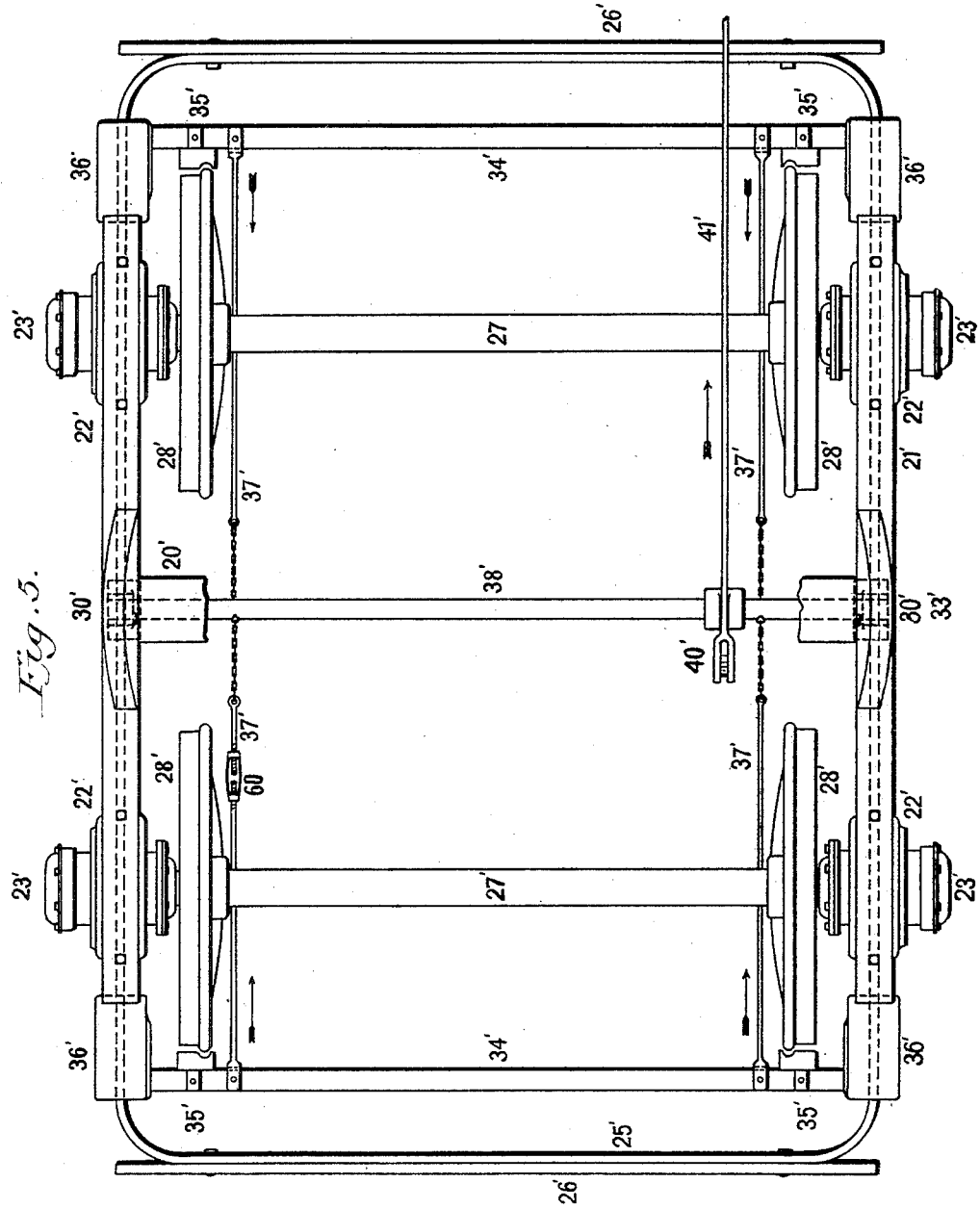

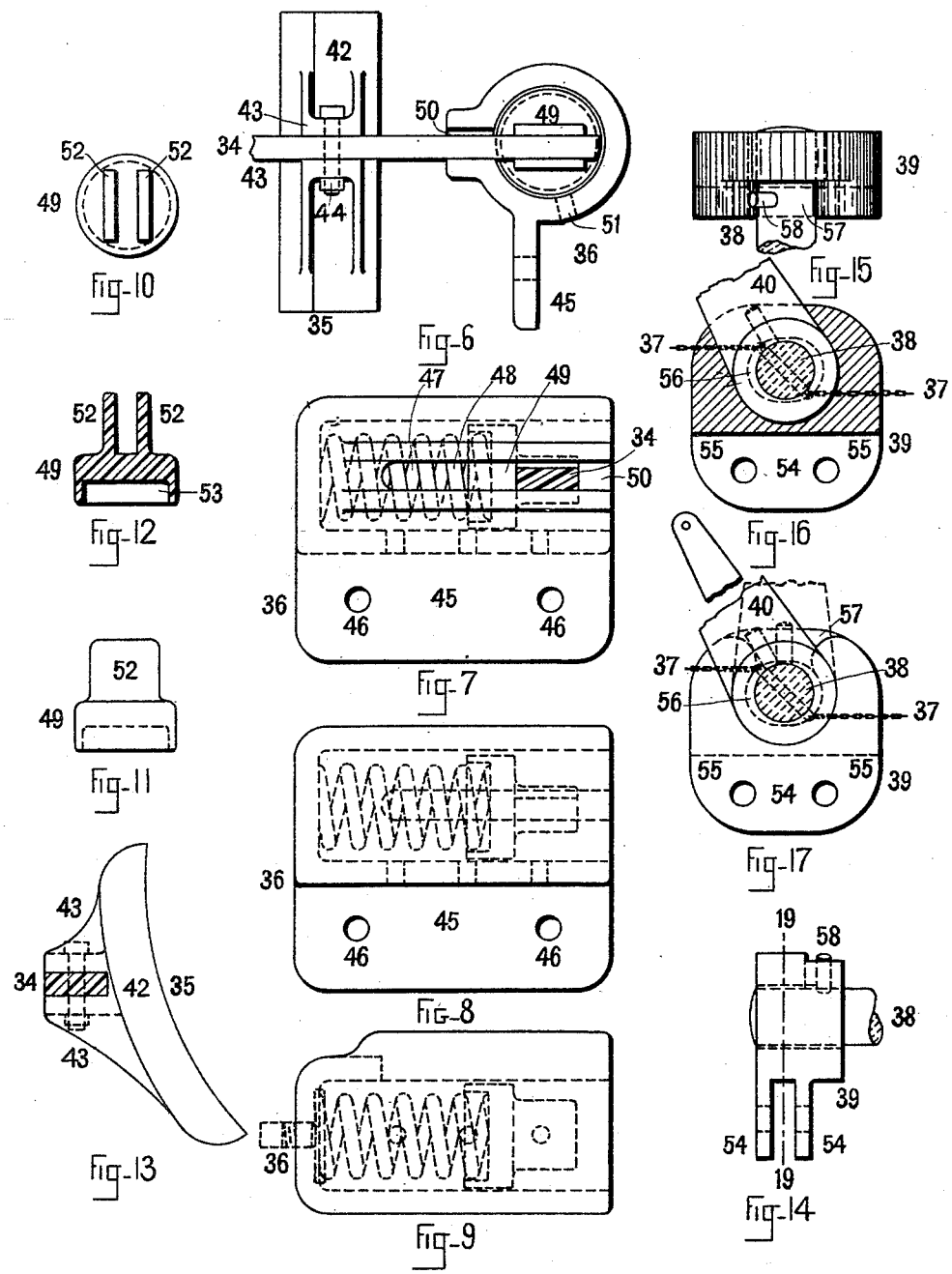

UNITED STATES PATENT OFFICE.

THOMAS TRIPP, OF AVON, MASSACHUSETTS.

CAR-BRAKE.

SPECIFICATION forming part of Letters Patent No. 450,762, dated April 21, 1891.

Application filed January 16, 1891. Serial No. 378,034. (No model.)

*To all whom it may concern:*

Be it known that I, THOMAS TRIPP, a citizen of the United States, residing at Avon, in the county of Norfolk and State of Massachusetts, have invented a new and useful Car-Brake, of which the following is a specification.

My invention relates to car-brakes designed to be used upon trucks of railway, street cable cars, and the like, and it is especially adapted for use upon double-truck or eight-wheel cars. It is also designed as an improvement of my invention in car-brakes, as set forth in application for United States Letters Patent, filed December 15, 1890, Serial No. 374,802.

The principal object of my improvement is to combine in a car-brake simplicity of construction with effective operation.

Figure 1 represents in side elevation the car-brake as applied to a double truck, the center brake-lever spider being shown in its usual position midway between the trucks and fastened to the car-body. Fig. 2 is a plan of Fig. 1, except that the center brake-lever spider is not shown and a portion of each truck-bolster is broken in order to more clearly show the car-brake mechanism. Fig. 3 represents in side elevation, upon an enlarged scale, one of the two trucks. Fig. 4 is an end elevation of Fig. 3; and Fig. 5 is a plan of Fig. 3, with a portion of the truck-bolster removed in order to better represent the brake-gear. Fig. 6 represents upon an enlarged scale, in end elevation, a portion of one brake-beam, a brake-block, a spring-cap, and a brake-beam holder. Fig. 7 represents in rear elevation one of the brake-beam holders, the brake-beam being shown in transverse section. Fig. 8 is a front view of Fig. 7, and Fig. 9 is a plan of Fig. 7. Fig. 10 represents in end elevation, upon an enlarged scale, one of the spring-caps. Fig. 11 is a front elevation of Fig. 10, and Fig. 12 is a central sectional view of Fig. 11. Fig. 13 represents in side elevation, upon an enlarged scale, one of the brake-blocks, the brake-beam being shown in transverse section. Fig. 14 represents in side elevation, upon an enlarged scale, a portion of one secondary brake-shaft and the secondary brake-shaft supporter. Fig. 15 is a plan of Fig. 14. Fig. 16 represents in elevation a portion of one of the brake-levers, showing the secondary brake-rod chains and a sectional view of Fig. 14 on line 19 19. Fig. 17 represents in elevation one of the secondary brake-levers, the center portion of which is broken, and a view in elevation of the secondary brake-shaft support, the secondary brake-lever being shown in a position by the use of dotted lines.

The following parts are all of a common type, such as are in use upon several street-railroads: truck-bolsters 20 and 20', wheel-pieces 21 and 21', pedestals 22 and 22', journal-boxes 23 and 23', side journal-springs 24 and 24', journal-box tie-bars 25 and 25', guards 26 and 26', axles 27 and 27', wheels 28 and 28', center plates 29 and 29', side bearings 30 and 30', center brake-lever 31, and center brake-lever spider 32.

Truck 33 is provided with brake-beams 34, brake-blocks 35, brake-beam holders 36, secondary brake-rods 37, secondary brake-shaft 38, secondary brake-shaft supports 39, secondary brake-lever 40, and brake-rod 41, and in a like manner truck 33' is provided with brake-beams 34', brake-blocks 35', brake-beam holders 36', secondary brake-rods 37', secondary brake-shaft 38', secondary brake-shaft supports 39', secondary brake-lever 40', and brake-rod 41'.

The brake-beams shown are pieces of iron rectangular in section. The brake-blocks are alike, except that they are rights and lefts, and one of the brake-blocks 35 (shown on an enlarged scale by Figs. 6 and 13) is made as follows: The main portion 42 is the same as the ordinary brake-block, and the two lugs 43 are provided, between which the brake-beam 34 is placed, and by means of the bolt 44 the brake-block is securely fastened to the brake-beam.

The brake-beam holders are alike, except that they are rights and lefts, and one of the brake-beam holders 36 is represented on an enlarged scale by Figs. 6, 7, 8, and 9, and it is provided with the following: flange 45, provided with holes 46, by means of which and the use of pins or bolts it is securely fastened to the journal-box tie-bar; spring-pocket 47, adapted to receive spiral spring 48 and spring-cap 49; slot or brake beam slide or guideway 50, adapted to support and guide the brake-beam, and holes 51, adapted for the clearance of dirt, water, or ice from the spring-pocket.

The spring-caps 49 are alike, and one is represented on an enlarged scale by Figs. 6, 10, 11, and 12, and it is provided with the two flanges 52, adapted to embrace the brake-beam, and the recess 53, adapted to receive one end of the spiral spring 48.

The secondary brake-shaft supports are alike, and one of the supports 39 is shown upon an enlarged scale by Figs. 14, 15, 16, and 17, and it is provided with the following: flanges 54, which are adapted to fit over the journal-box tie-bar, to which the support is fastened by the employment of pins or bolts, and the holes 55, which extend through the flanges and tie-bar, and oblong hole 56, adapted to receive within it the end of the secondary brake-shaft 38. The oblong or enlarged hole is provided for the purpose of permitting a slight horizontal movement of the secondary brake-shaft. Opening 57, used in conjunction with the pin 58, which is securely driven into the end of the shaft, limits the backward movement of the secondary brake-lever 40, which is securely fastened to the shaft. In Fig. 17 the brake-lever is shown in its backward position, and the pin is against one side of the opening 57, and its forward position is represented by a portion of the lever and the pin being represented by dotted lines.

In Figs. 16 and 17 the position and angle of the fastening of the chain ends of the secondary brake-rods are shown. This angle of fastening is preferred, for the reason that a rapid shortening of the rods is obtained when the secondary brake-lever is drawn in operation from its backward to its forward position.

The parts of the truck of a common type, as previously designated, are constructed and arranged in the usual manner. All other parts, their construction having been stated, are arranged as follows: The brake-blocks are fastened to the brake-beams in position of of oppositeness relative to the wheel-treads. Each end of each brake-beam extends into and is guided by its respective brake-beam holder, and each end is supplied with a spring-cap, which receives one end of a spiral spring, the other end pressing against the closed end of the brake-beam holder. Midway between the axles of each truck and parallel thereto is placed the secondary brake-shaft, mounted in the secondary brake-shaft supports, which are fastened to the journal-box tie-bar. Each shaft is provided with a secondary brake-lever. In truck 33 the brake-beams 34 are connected with the secondary brake-shaft 38 by means of the secondary brake-rods 37, one end of each of the rods being provided with chains, the end of which is secured to the secondary brake-shaft, the chain ends being provided to insure the desired freedom of motion.

The secondary brake-lever 40 is connected with one end of the center brake-lever 31 by means of the brake-rod 41. In a like manner in truck 33′ the brake-beams 34′ are connected with the secondary brake-rods 37′ and have one end provided with a chain, and the secondary brake-lever 40′ is connected with the other end of the center brake-lever 31 by means of the brake-rod 41′.

The central brake-lever is designed to be operated in the usual manner by power applied to it in a common way and conveyed to it by means of the brake-shaft connecting-rods 59 and 59′. The power used may be directly applied to the brake-shaft connecting-rod by means of the usual brake-shaft or by the employment of power-brake apparatus which may be connected with the center brake-lever in any well-known manner.

Each secondary brake-rod may be made adjustable by the employment of any well-known means, such as the turn-buckle 60, as represented in Fig. 5.

The tension of each spiral spring may be adjusted within its spring-pocket by the employment of any well-known adjusting device, such as the plate and set-screw, as represented in dotted outline in Fig. 9.

The parts having been constructed and arranged as shown and described, the operation of my device is as follows: Power being conveyed to the center brake-lever by means of either of the brake-shaft connecting-rods 59 or 59′ in the common well-known manner is first transmitted in the form of a reciprocating motion to the brake-rods 41 and 41′. It is then transmitted to the secondary brake-shafts 38 and 38′, respectively, and the reciprocating motion of the brake-rods is changed into the rotating motion of the secondary brake-shaft by reason of use of the secondary brake-levers, one of which is attached to the secondary brake-shaft. The power is then changed into a reciprocating motion of the brake-beams, and the power first transmitted to the brake-rods is finally absorbed by braking action of the brake-blocks against the wheels. As both trucks are alike, a more detailed operation of truck 33′, represented on an enlarged scale by Figs. 3, 4, and 5, is hereby given. When it is desired to set the brakes and the brake-rod 41′ is drawn toward the platform of the car nearest the truck, the secondary brake-shaft 38′ is compelled to rotate and the rotation winds up the chain ends of the secondary brake-rods 37′, thereby shortening up the rods and drawing the brake-beams 34′ toward each other with great power, which is absorbed by the braking action of the brake-blocks 35′ against the treads of the wheels 28′. Powerful leverage is obtained by the use of the secondary brake-lever. The function of the spiral springs is to push the brake-blocks away from wheel-contact, thereby releasing the brakes when the power applied is removed by the operator. The use of the oblong holes in the secondary brake-shaft supports is to allow a certain freedom of movement of the secondary brake-shaft within the secondary brake-shaft supports which it is desirable to have, as the trucks are sometimes twisted or racked in use.

The use of the pins or stops located near the end of each secondary brake-shaft is for the purpose of limiting the backward rotary movement of the secondary brake-shafts caused by the pressure of the spiral springs when the brake-gear is released.

What I claim as new, and desire to secure by Letters Patent, is—

1. In a car-brake, a secondary rotative brake-shaft, the rotary movements of which are obtained by power transmitted to said shaft by means of brake-rods, in combination with the guided reciprocating brake-beams and operative connections, whereby the braking power against the treads of the wheels is transmitted from said shaft to said brake-beams by means of the secondary brake-rods in such a manner as to subject said rods to tensile strains, substantially as described.

2. In a car-brake, the combination of the rotative secondary brake-shaft provided with a secondary brake-lever, which is operated by means of power transmitted to the lever by means of the brake-rod, and the secondary brake-rods with the reciprocating brake-beams which are directly connected to said shaft by said secondary brake-rods and the reciprocating movements of which are guided by the brake-beam holders, substantially as described.

3. The combination of a secondary brake-shaft journaled in supports which are mounted upon the journal-box tie-bars, said shaft being operated by means of power transmitted to it by the brake-rod and being operatively connected with the guided brake-beams, whereby in operation the rotary motion of the shaft draws the brake-beams which are guided in their reciprocating movements by the guideways toward the shaft, thereby forcing the brake-blocks against the wheel-treads, said forcing action being resisted by the spiral springs, substantially as and for the purpose set forth.

4. In a car-brake, the combination of the secondary brake-shaft, lever, and rods with the brake-beams provided with brake-beam holders, substantially as described.

5. In a car-brake, the combination of the secondary brake-shaft, lever, and rods with the brake-beams and brake-beam holders provided with spiral springs and guideways, substantially as described.

6. In a car-brake, the secondary brake-shaft, the ends of which are journaled in supports and are provided with stops to limit the backward movement of the shaft, in combination with the brake-beams and brake-beam holders, substantially as and for the purposes set forth.

7. In combination, in a car-brake for double trucks, of the secondary brake-shafts 38 and 38', operating by rotary motion the brake-beams 34 and 34', respectively, with the center brake-lever 31, and operative connections, substantially as described.

8. In combination, the following elements in a car-brake for double trucks: rotative secondary brake-shafts 38 and 38', reciprocating brake-beams 34 and 34', brake-rods 41 and 41', provided with flexible ends, center brake-lever 31, and brake-shaft-connecting rods 59 and 59', substantially as described.

In testimony whereof I have signed my name to this specification in the presence of two subscribing witnesses.

THOMAS TRIPP.

Witnesses:
J. EDWARD PORTER,
CHARLES O. FARRAR.